United States Patent [19]

Wells

[11] Patent Number: 5,509,853

[45] Date of Patent: Apr. 23, 1996

[54] METHOD AND MANUFACTURE FOR PURIFYING THE ATMOSPHERE

[76] Inventor: Del Wells, 250 S. Orchard, Burbank, Calif. 91506

[21] Appl. No.: 272,934

[22] Filed: Jul. 11, 1994

[51] Int. Cl.$^6$ .............................. B60H 3/06; F24F 13/28
[52] U.S. Cl. ................... 454/370; 55/385.3; 55/515; 96/147; 96/152; 454/69; 454/83; 454/156
[58] Field of Search ................... 55/385.3, 515, 55/516, 418; 96/108, 121; 454/11, 83, 88, 118, 156, 158, 370

[56] References Cited

U.S. PATENT DOCUMENTS

| | | | |
|---|---|---|---|
| 1,662,738 | 3/1928 | Cougle | 55/515 X |
| 2,294,183 | 8/1942 | Holm-Hansen | 96/152 |
| 2,536,274 | 1/1951 | Gaugler | 96/108 X |
| 2,785,620 | 3/1957 | Welch | 454/11 X |
| 3,738,088 | 6/1973 | Colosimo | 55/385.3 X |
| 3,941,034 | 3/1976 | Helwig et al. | 454/158 X |
| 5,147,429 | 9/1992 | Bartholomew et al. | 55/385.3 X |

FOREIGN PATENT DOCUMENTS

| | | | |
|---|---|---|---|
| 1347078 | 11/1963 | France | 96/152 |
| 297341 | 10/1992 | Japan | 454/158 |
| 2218354 | 11/1989 | United Kingdom | 55/385.3 |

*Primary Examiner*—Harold Joyce

[57] ABSTRACT

A manufacture and method by which particulate in the polluted ambient air is collected and retained, thereby purifying the ambient air. The manufacture is mounted amid a vehicle (17, 38, etc.) at a location always accessible to the ambient air in the atmosphere. Relative motion between vehicle and the polluted ambient air (37, 65) provides confrontation of the polluted air with a confronting receptacle (14) in which loosely gathered together pellets (13) are gathered together. Receptacle (14) comprises wire mesh (15) having interstices (31) smaller than the size of the pellets (13). As relative motion occurs between vehicle (17) and polluted air (37, 65), receptacle (14) confronts the polluted air, its pellets (13) entrapping particulate in the polluted ambient air, thereby purifying the ambient air and thereafter it being directly returned to the ambient air in the atmosphere. Alternative embodiments (43, 55) provide cages (26) into which receptacles (14) with their pellets (13) are put. Also, embodiments include putting cage, receptacles and pellets at stationary points where polluted ambient air is known to flow. In one alternative embodiment, a weather vane (56) seeks a position for a larger side of its cage.

12 Claims, 2 Drawing Sheets

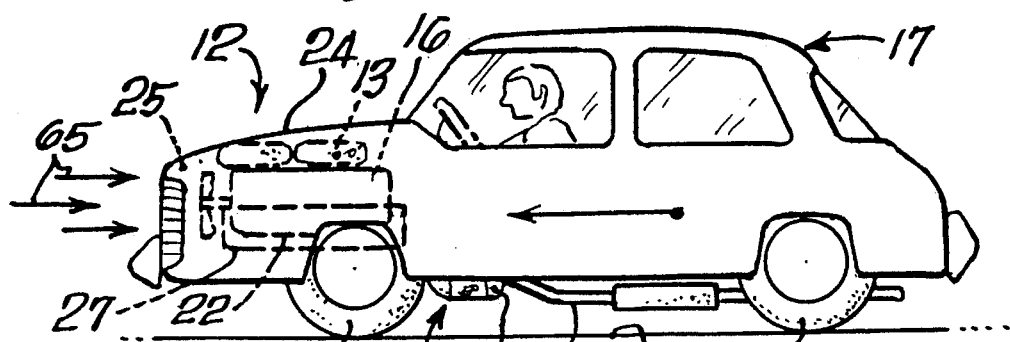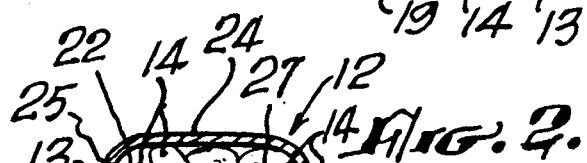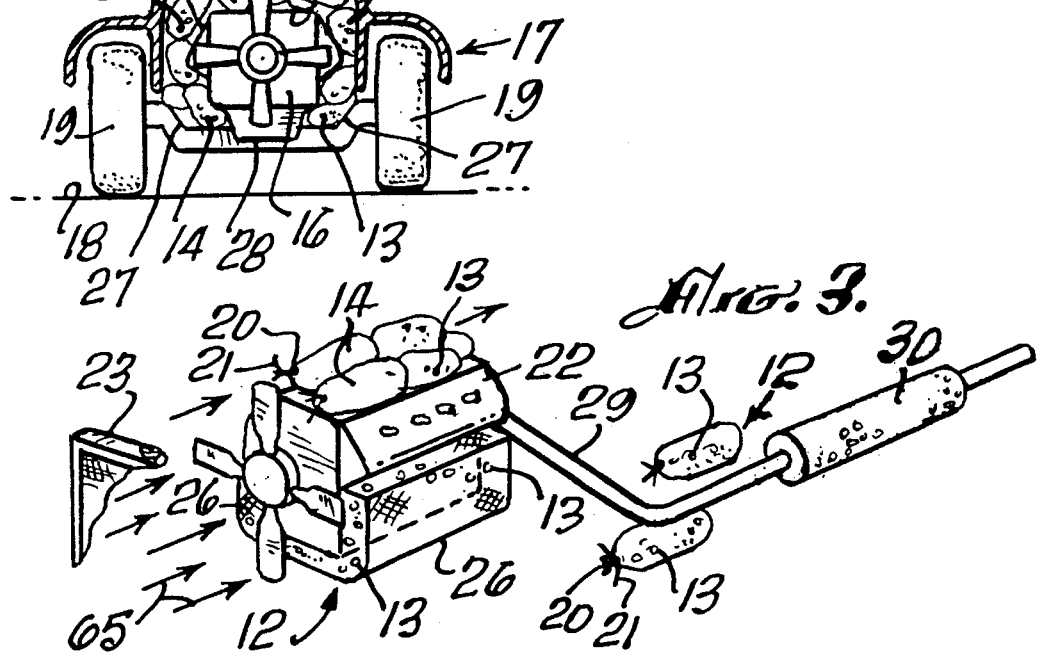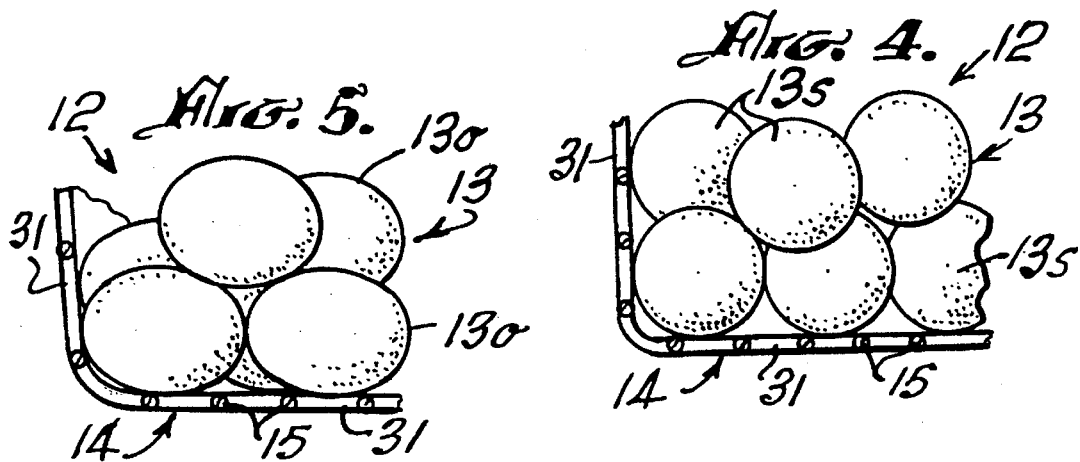

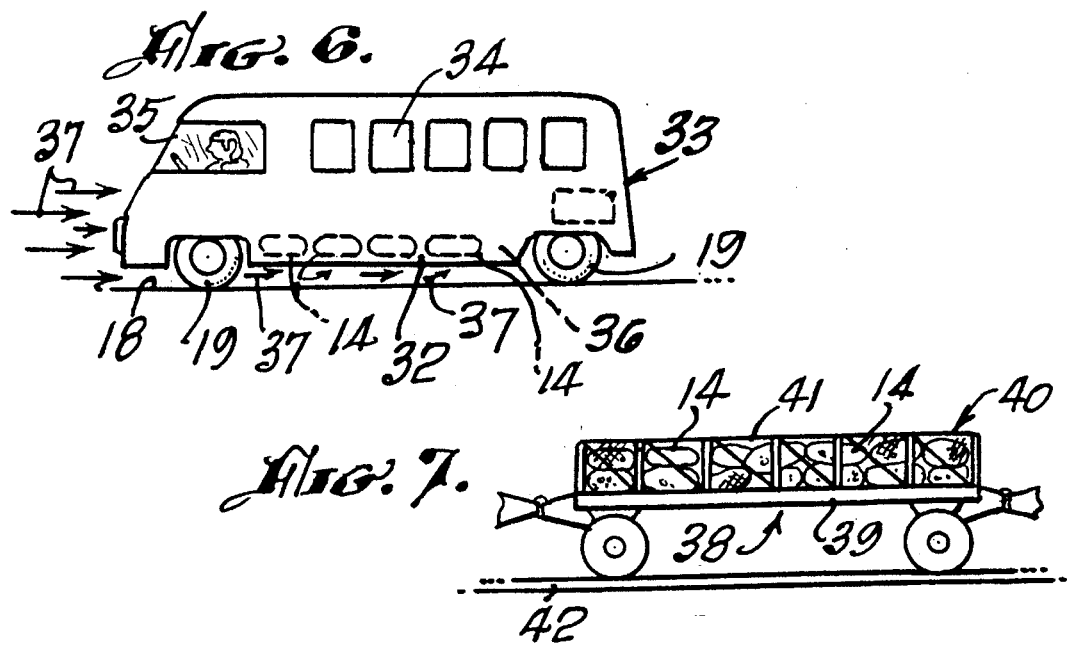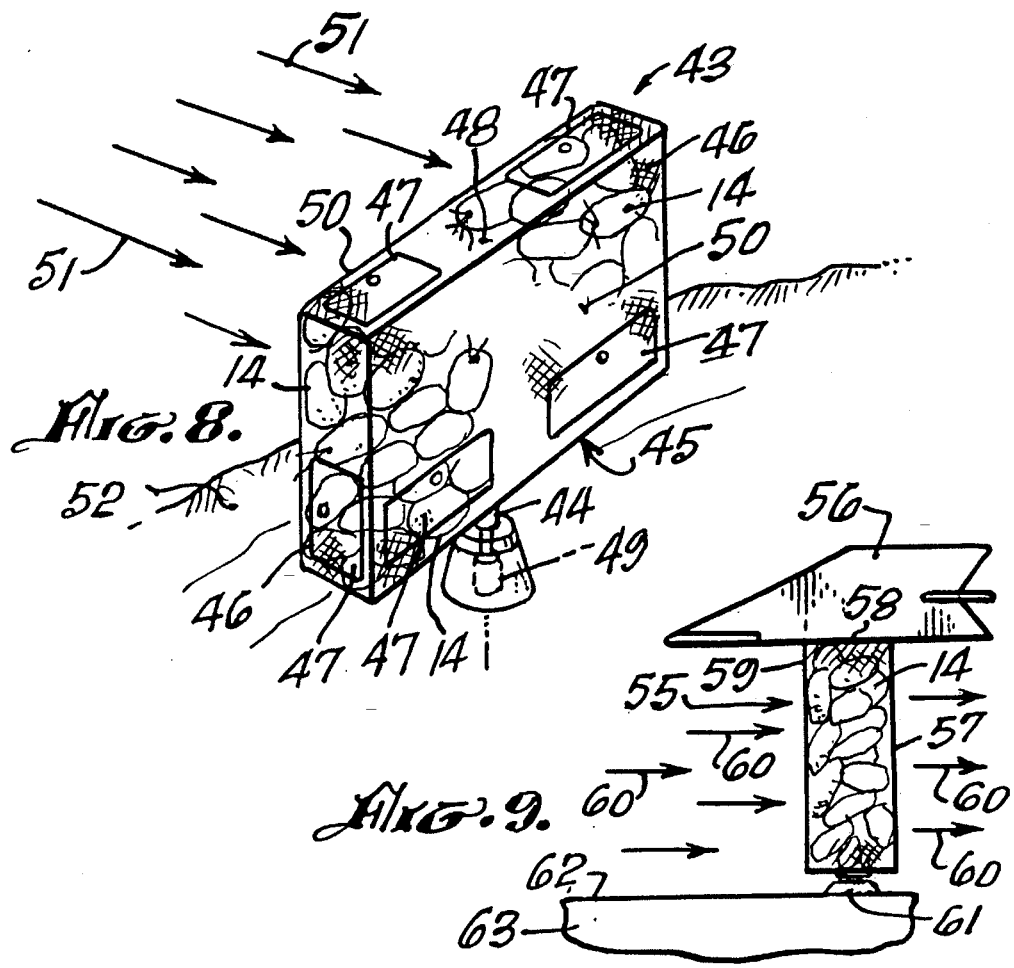

METHOD AND MANUFACTURE FOR PURIFYING THE ATMOSPHERE

TECHNICAL FIELD

This invention relates to the purification of the ambient air per se in our environment, about the earth's atmosphere, and in particular to a method and manufacture for purifying such air that has been and is being polluted by motor vehicles and other polluting industrial sources or gases.

BACKGROUND OF THE INVENTION

In today's environment of the atmosphere about the earth's surface, concerns have been and are being expressed about the kind and degree of pollutants or contaminants in the atmosphere, and what can or should be done to purify their resulting pollution or contaminates, or "polluted air", as it is commonly expressed, in the atmosphere. The sources of this pollution are found in industrial areas where waste gases are emitted from plants and factories into the air as well as from emissions by all kinds of vehicles (surface and air) and from industrial wastes in the atmosphere. In particular geographical areas, man-made pollutants, singly or in combination with the natural hazes or pollutants naturally arising about the earth's surface, aggravate the already known unhealthy regional atmospheric conditions. Under certain conditions, the condition is described as "smog". For example, the southern portion of the state of California, USA, "smog" inundates the area, formed from a combination of noxious gases of various sorts, an example of one being nitrous gases that are generated from the exhaust systems of vehicles on roadways, singly or in combination with other gases natural or industrially originated. In fact, the state of Californian requires catalytic converters at this point in time for all new passenger vehicles sold in the state, as an added effort to reduce the amount of pollution that would otherwise enter the air by reason of the vehicle's operation.

The earth's atmosphere indeed is daily being polluted from the burning of fossil fuels by industrial processes and by motor vehicles.

It has become clear that concepts in the past, and their implementations, have been directed to purifying air inside a vehicle or inside homes, offices or factories, either for immediate use or for purifying air contaminated by such implementations, and not in purifying the ambient air itself. In the first instance, the ambient air is purified prior to its introduction to or receipt within a vehicle's compartment or cab in which a driver or passenger is disposed, such as by providing filter devices mounted to the roadway vehicles and to and through which air would be gathered, filtered, and then discharged into the compartment or cab. Prior art teachings, such as U.S. Pat. Nos. 2,232,109; 4,408,911; 4,711,159; and 4,953,449, disclose concepts for purifying air that enters such compartments or cabs. Also, air conditioning devices mounted in the engine compartment of roadway vehicles are the modern day answer to an air-clean cab or compartment.

In the second instance, as an example, catalytic converters reduce the contamination of an exploded gaseous mixture so that one of its effects is to reintroduce into the ambient air some air that is less contaminated than otherwise.

What is of concern here is the good health of people, whether in a vehicle or merely somewhere in the atmosphere itself. To date, the health of people has been taken fairly into consideration while not unduly taking away their industriousness, by requiring emission restrictions on emitted gases generated by plants and factories, i.e., by man-made industriousness, and by requiring devices resulting from such industriousness, and by requiring devices resulting from such industriousness, they being applied to motor vehicles, particularly those with internal combustion engines.

Nevertheless, air pollution and its problems persist on planet earth. No apparatus or method to date has been recognized as a complete or final solution of any kind or to or of any degree for the health problem posed by noxious or deleterious gases in the atmosphere emanating from innumerable sources, some generally indicated above.

In this background, and within the context, though not limited thereto, of emissions from motor vehicles, the present invention was generated to reduce deleterious substances in our environment, the amount of such pollution, whether by vehicle or otherwise, and thereby increase advantageously the levels of health for human beings while providing a healthful environment in or about the natural surroundings on the earth's surface.

SUMMARY OF THE INVENTIVE CONCEPT

The invention comprises a manufacture and a method applied to vehicles (egs., passenger, truck, train, dirigible) on roadways, surface or rail, and airborne, for purifying the ambient polluted air per se in the atmosphere through which these vehicles travel and return it immediately or directly to the ambient air. In addition to purifying compartments or cabs, past concepts in their implementation have been directed to reducing the amount of pollution discharged from exhaust systems that are part and parcel of an engine system generating power. And as mentioned above, in the case of roadway vehicles, catalytic converters lower the amount of pollution discharged from their engines via muffler systems. However, in the instant invention, the concept is directed, not to lowering the amount of pollution being emitted from vehicle exhaust systems, or to purifying air prior to immediate use in vehicles interior cabs or compartments, but rather is directed to removing pollution in the atmosphere's ambient air itself, purifying such air directly. Regardless of the amount of pollution in the ambient air, and how it got there, this invention purifies the ambient air itself, and returns the purified air immediately to the ambient atmosphere. A vehicle traveling through the polluted ambient air in utilized as one means by which the inventive manufacture and method are put into operation. In other words, the polluted air being purified is that which is continuously flowing in the atmosphere itself, never ending in such flow, except for interruption by application of the invention itself, and not in some way, as heretofore, utilized in and for a man-made contraption. Operation of the invention takes the polluted air as it comes, acting directly on it and which is not modified by any contraption for another use. It is the polluted air itself in the atmosphere that is being purified by the application and the operation of this invention. The invention purifies polluted ambient air that does not enter the compartment or cab of a vehicle or its atomizing carburetor or other means for combining it with a liquid or gas for a different use. It is applied at a location at which the invention always is accessible to the polluted ambient air, using the source (an operating and/or moving vehicle) of a major portion of air pollution to filter the ambient air.

The gist of the inventive concept in the direct purification of polluted ambient air is to operate a filter manufacture that directly entraps particulate in the ambient air within its own substance, applying the manufacture by a relative movement or motion to the polluted ambient air, or vice versa. The relative motion is achieved, in one application of the manufacture, by mounting it to a roadway vehicle, in a location thereon by which such air rushes by as the vehicle moves along its course of direction. The location is such that the polluted ambient air is continuously, never ending, flowing towards the manufacture, is confronted by it, and then through the action of the manufacture, entraps the particulate in the polluted ambient air within the manufacture's substance, with the air then continuing to flow, now purified, directly into the extant of the atmosphere, to the rear of the moving vehicle. With such a purifying means in the manufacture and the manner of its mounting to an innumerable number and kind of traveling vehicles along innumerable roadways, airways, etc., i.e., amid the vehicles, and operating such vehicles throughout the polluted atmospheric climate, situation, or environment that is present and to a good extent developed much from the operation of these same vehicles in such climate, situation or environment, the polluted air is removed from such climate, situation or environment by the movement therethrough of the subject matter of the invention.

DISCLOSURE OF THE INVENTION

The inventive concept is implemented in and embodied in one or more, usually a plurality, of replaceable biodegradable spheres, pads or pellets maintained within a receptacle comprising interstices through which polluted air travels to be entrapped in the substance of the spheres, pellets, or pads (hereinafter sometimes referred to as pellets). A plurality of these receptacles with pellets therein are mounted at locations in, on and above a vehicle employed in the application and operation of the invention, and are exposed to a never ending flow of the polluted air. In some applications, a pliable or yielding mesh or netting forming a cage or the like holds or supports a plurality of the receptacles with their pellets therein, in locations where flowing polluted air rushes through the cages to confront the receptacles, moving through the latter's interstices to reach the pellets that then entrap or collect the particulate in the ambient air, the then purified air continuing to flow, out of the cages and receptacles to beyond the vehicle back into the atmosphere. A blanket of the filter material can serve as a filtering element directly under and attached to the hood of a motor vehicle, replacing the pad material now used to muffle the sound of the engine, the filtering element being replaceable, and being held in place by netting or metal clips. These particulate are caught or entrapped by the substance of the pellets while the air itself passes through the pellets, to return to the ambient air in the atmosphere. The receptacle is of pliant and yielding material that assumes the shape or configuration required for it to be positioned at its particular location at which it is put, i.e., for adaptation directly to a particular frame, structure, and pocket or void formed by frame or structure and voids thereabouts. The cage itself, when used with the receptacles, is formed to fit the pocket or void about such frame or structure, it, of course, having apertures or passageways in itself. One or more of these receptacles with interstices and pellets are not disposed within the vehicle's compartment or cab that are closable to the atmosphere or ambient air, but rather located in positions always accessible to ambient air, such as under the hood of the vehicle in which its engine is disposed, or mounted atop a vehicle's roof, or under, in front of, to the sides of, or behind the vehicle, or within or upon a vehicle's bed, open or exposed to the ambient air of the atmosphere about it. In other words, the locations are always accessible to the flow of ambient air, not like closable cab or compartment by way of closed door or window pane. It is envisioned by the inventor that future vehicles would be designed to provide specific areas capable of containing maximum filter elements to filter an excess of the air.

The receptacles with their pellets are fixed in place, such as to the underside of the hood, or to an engine block under the hood of a vehicle, or behind its radiator and cooling fan, or is securely mounted or fixed elsewhere to the vehicle. Any number of conveniently-or-suitably-size receptacles with their pellets may be utilized in any of the noted or other suitable fixed settings for them on a vehicle. Thus, when relative motion occurs between vehicle and polluted ambient air, the particulate confronts the receptacle and then is entrapped within its pellets while thereafter the air, now purified, returns directly to the atmosphere, purified to a greater degree than its state or degree of purity (actually being impure) that it was in the polluted air prior to action by the purifying means or manufacture and/or method.

An object of the invention is to purify polluted ambient air in the atmosphere above the planet earth's surface.

Another object of this invention is to return the fouled portions of the atmosphere to mother earth.

Another object of this invention is to utilize a vehicle that degrades the atmospheric element as it passes through such element, by filtering out deleterious substances of the exhaust of another vehicle, to a degree over and above the amount of such substances being emitted by both vehicles.

A further object of this invention is to provide a biodegradable filtering element by which polluted air through which it moves is purified.

Another object of this invention is to provide a novel method of purifying ambient polluted air.

Another object of the invention is to provide a novel, yet simple and inexpensive, manufacture for mounting to and be in combination with a vehicle that is traveling through the polluted ambient air.

A further object of the invention is to provide to an average motorist a facile installation to the motorist's vehicle of the subject matter of the invention.

These and other objects and advantages will become more apparent upon a full and complete reading of the following description, the appended claims thereto, and the accompanying drawing comprising 2 (two) sheets of 9 (nine) FIGURES.

BRIEF DESCRIPTION OF THE DRAWING

FIG. 1 is a side view of a passenger vehicle showing application of the invention to it, wherein the pellets' receptacles are shown disposed and mounted in the chamber or void found under the hood for the engine of a vehicle.

FIG. 2 is a diagrammatic front view of an engine compartment with a plurality of replaceable pellet receptacles about the engine.

FIG. 3 is a perspective view of portions of FIGS. 1 and 2, with their vehicles removed.

FIG. 4 is a fragmentary view of pellets within its receptacle.

FIG. 5 is a fragmentary view of an alternative form of the pellets within its receptacle.

FIG. 6 is a side view of a bus, van or the like, showing dispositions therein of receptacles of pellets.

FIG. 7 is a side view of a vehicle or railway car on which the subject matter of the invention is combined in an open manner with its vehicle.

FIG. 8 is a perspective view of an alternate embodiment of the invention, mounted to a drive that orients the maximum exposure of the embodiment to the direction of oncoming ambient air (including wind).

FIG. 9 is a schematic view of another embodiment of the invention that aligns itself to the direction of oncoming ambient air by means of a weather vane.

THE BEST MODE FOR CARRYING OUT THE INVENTION

Referring now to the drawing wherein reference characters correspond to like numerals hereinafter, FIGS. 1–5 illustrate the subject matter 12 of the invention, comprising a plurality of pellets 13, loosely gathered-together and held in a receptacle 14 formed of wire mesh 15 or the like, FIGS. 4, 5, one or more of, usually a plurality of, the receptacles 14 being suitably mounted to an engine block 16 of a vehicle 17. Vehicle 17 is adapted to travel along a roadway 18, FIGS. 1, 2, in a conventional manner, such as by the power of the engine in its block 16 being transmitted to the tires 19 of the vehicle. Each receptacle 14 includes a suitable opening 20, FIG. 3, through which pellets 13 are introduced into and taken out of it, and a suitable closure means, such as a strong string 21, or a tie, or buttons, or a zipper, or a "ZIPLOC" plastic storage bag means, etc., is included for each receptacle 14 for retaining its pellets 13 in its receptacle 14. Each of the receptacles 14 is of a size suitable for mounting one or several of them upon the top of the engine block 16, FIGS. 1, 3, as well as about the housing 22 of a manifold conventionally associated with the engine block 16. The receptacle 14 with pellets 13 is conveniently held in such locations, such as by suitable hooks or the like (not shown) attaching them to the block 16, and in suitable locations thereabout created by a void between the engine block 16, its accessories (egs., the carburetor, water pump, radiator 23, etc.) connected thereto and the vehicle's hood 24 when in closed mode with the surrounding walls forming the engine compartment 25 in which the engine block 16, etc., are disposed. It is to be noted that the location(s) to which the receptacle with pellets are put are always accessible to ambient air vis-a-vis locations that are closable off to ambient air, such as cabs and passenger compartments of vehicles. The inventive concept also extends to setting the receptacles and their pellets in such void without being attached to the engine block 16 or other components disposed within the engine compartment 25, but not interfering with the closure of hood 24, as the engine compartment confines such receptacles to its own location by the pliable or yieldable receptacle or the physical constraints of the compartment itself.

Another manner of fixing receptacles with pellets to a fixed location is by utilizing one or more suitably-sized mesh or screen cages 26, FIG. 3, that are suitably fixedly mounted to one or both of the opposing side locations 27, FIGS. 2, 3, of the engine block 16. One or more cages 26 extend down around the bottom or underside 28, FIGS. 2, 3, of the engine block 16. Each cage 26 contains a plurality of wire receptacles 14 of pellets 13. The cage 26 need not extend around the bottom 28 of the engine block 16, as a number of cages 26 can be suitably mounted about or around the engine block 16, either fixedly or setting loosely or snugly within the noted void in the engine compartment 25.

The inventive concept includes an implementation that corresponds to merely one or more cages 26 with pellets 13 therein, should a particular situation make it effective to have but cage and pellets vis-a-vis receptacle with pellets and cage.

FIG. 2 illustrates the practicability of a plurality of apertured receptacles 14 with their pellets 13 therein as being located all around the engine block 16 and under the hood 24 of a vehicle 17.

FIG. 3 further illustrates one or more receptacles 14 with pellets 13 being suitably mounted and secured thereto along the piping 29 connecting the manifold's housing 22 to the muffler 30, such as by hooking means (not shown), or otherwise suitably positioned thereabouts, taking into consideration any physical restraints of the vehicle's body formation(s) and voids in which the piping 29 is positioned. It should be understood that the the body formations and voids described here, in relation to FIG. 3, does not limit them to this illustration, being found elsewhere as well amid a vehicle.

FIGS. 4 and 5 illustrate two (2) forms of pellets 13. In FIG. 4, the pellets take on a spherical shape or configuration 13s. In FIG. 5, the pellets take on the shape or configuration of ovalness, 13o. They may take other forms, such as cubes, or of hexahedron shape, or of any other geometrical shape which in a given location for purifying polluted air is found to be more efficient than by one of the pellets illustrated in the drawing embodiments. The size and geometrical pattern or configuration of a pellet 13 should include a surface area that maximizes the total surface area available for entrapping the particulate when a plurality of pellets 13 are loosely-gathered together in a receptacle 14 or other envelope or envelope where a receptacle is not used. The receptacle 14, fabricated from suitable wire mesh or the like that is heat resistant, includes interstices 31 therein that are not of a size that would facilitate or tolerate the slip-through of any particular-sized pellets 13 from their receptacles 14. It should be understood that each receptacle 14 may include a mixture of any shape or configuration of pellets 13, and that the pellets need not be of uniform size in the same receptacle or envelope in the actual use of the invention.

FIG. 6 illustrates an embodiment of the invention wherein receptacles 14 of pellets 13 are mounted in a lower portion 32 of a bus or van 33, exteriorly of its passenger compartment (s) 34 and cab 35, in a location or void 36 always accessible to flowing polluted ambient air, such as under the chassis of the vehicle 33, so that polluted ambient air, its direction of flow being represented by arrows 37 in FIG. 6, flows towards and confronts the receptacles 14 with their pellets 13 as vehicle 33 travels along the roadway 18.

FIG. 7 represents or illustrates another application of the invention, in reference to a vehicle 38 having a bed frame 39 that is wide open, i.e., again always accessible to ambient air in the atmosphere. One or more of receptacles 14 each containing a plurality of loosely-gathered-together pellets 13 are mounted in their loose manner or mode, for example, piled up one on top of the other, upon the bed of frame 39, with a fence-like barricade 40, including its own apertures 41 through which polluted ambient air can pass, suitably connected to the bed frame 39 to prevent the receptacles from flying off of their bed on frame 39. Vehicle 38 represents moving railway stock cars, pick-up trucks or vans, roadway trucks, etc., any vehicle having a frame 39 on which an open bed is mounted and which is always accessible to the atmosphere, moving along either tracks or a roadway 42. A bedded vehicle 38 preferably is of a size whereby a sizable number of receptacles 14 with pellets 13, or even screen or mesh cages 26 or other equivalent envelopes, with receptacles of pellets, confront polluted ambient air, as the vehicle travels through the ambient air, for the purpose of purifying it in operation of the invention. The bedded vehicle 38 may, or course, be of any size. The inventive concept also embraces but one receptacle 14 positioned throughout substantially the entire openness of a frame 39, with pellets 13 therein, the frame 39 and barricade 40 with its apertures 41 functioning like a receptacle 14 should this be practical.

FIG. 8 illustrates another application and embodiment 43 of the invention, wherein the embodiment itself includes means 44 to seek a position in which position the flow of polluted ambient air is captured, purifies it, and returns it to the atmosphere in a purified state or condition. Embodiment 43 comprises an apertured envelope or case 45 formed from wire or screen mesh 46 configured to produce a chamber for reception and disposition of a plurality of receptacles 14 with their pellets. One or more doors 47 are mounted in and hinged, to a side 48 provided in the envelope 45 for introduction and insertion and removal of either receptacles 14 with their pellets, or the pellets 13 themselves where the apertures of the case 45 are smaller than the size of the pellets 13. A drive means 49 operatively connected to the means or drive shaft 44 seeks a desired position for positioning the embodiment 43 so that one of the sides 48, preferably one of the two largest sides 50, in case 45 is positioned to confront flowing polluted ambient air illustrated by arrows 51. The pellets 13 entrap the particulate in the polluted ambient air thereby purifying such air and returning it to the atmosphere in a purified state or condition. One location for the embodiment is on a mountain or hill top 52 where flow 51 of polluted air is known.

FIG. 9 illustrates an embodiment 55 comprising a combination of a mechanical weather vane 56 fixedly mounted atop an envelope or case 57 containing a plurality of receptacles 14 containing pellets 13, or again just pellets where the apertures (not shown) in case 57 are smaller than the size of the pellets. Vane 56 is secured transversely across the topside 58 of envelope 57 so that one of its larger or largest apertured areal sides 59 confronts polluted ambient air as it flows in a direction 60 towards vane 56 and case 57 which in its action orients itself, as shown, to such flow of air. The combination of vane and envelope is suitably secured by a base mounting member 61 to the top or roof 62 of a building 63, or elsewhere, in a situation or environment in which it is known that polluted ambient air flows in the atmosphere.

In operation of each of these embodiments of the subject matter 12 of invention, the relative motion between the manufactures including the receptacles 14 with pellets 13, in their specified locations, and the polluted ambient air provides for the confrontation of each of these manufactures with such air, and by reason of the penetration of the pellets 13 by such ambient air flowing through their receptacles and cases or envelopes, the particulate in the polluted air is entrapped or snared by the substance of the pellets 13, while the air continues to flow through the pellets to return immediately or directly in a purified or more purified state or condition to a surrounding ambient atmosphere.

In more particularity, it is observed in FIGS. 1–3 that the vehicle is moving the receptacles 14 of pellets 13 through the polluted atmospheric surroundings, illustrated by arrows 65 in FIGS. 1, 3, along the roadway 18. Thus, the pellets 13 function as collectors and retainers of the particulate that makes up the pollution in the ambient air of the vehicle's surroundings, while their receptacles 14 locate them, here in the vehicle 17. The pellets 13 entrap the particulate and thereby purify the air as it passes through them. In this manner, the polluted air is purified and returned directly and immediately to the ambient atmosphere. It is important to note that the receptacles 14 of pellets can be mounted and located on the vehicle 17 at any of its points where the receptacles confront the polluted air flowing by and around the vehicle. It becomes apparent that closed, isolated and/or defined, compartments, such as the driver's and/or passenger's compartments, do not fit the bill in the application or operation of this invention, as they are capable of closing against the flow of polluted ambient air vis-a-vis locations always accessible to the ambient air.

After a period of time, the pellets 13, having entrapped and collected the particulate in the polluted ambient air, are removed from its receptacle 14, and the receptacle 14 replenished with fresh or otherwise unused (including clean or partially used or clean) pellets 13. The string 21 is taken off of its opening 20, the particular pellets removed and a fresh supply of pellets 13 put into each receptacle 14, such as by being accomplished manually or otherwise, and an old or new string 21 replaced in tightened condition about its opening 20.

The same holds true for operation of the embodiments of the invention illustrated by FIGS. 6 and 7. In the instances of operation of these embodiments, it is to be noted that a greater quantity of receptacles of pellets 13 is mounted to or on the vehicles 33, 38 at locations that accommodate a mounting of or for a greater quantity thereof. The vehicle 38 by its very nature, i.e., having an open and enlarged bed on its frame 39, provides for such a mounting.

FIGS. 8 and 9 represent operations of embodiments of the invention in which the flow of polluted air is in the direction of stationarily mounted devices 43, 55 comprising the elements of the subject matter 12 of this invention, rather than the subject matter 12 of the invention moving into the polluted ambient air itself. The operations in these two embodiments of the invention remain substantially the same, with the same beneficial, useful and novel result of purifying the atmosphere.

The substance of the pellets 13 is inherent in filter materials that are readily available in the market place, the kind of filters which according to micron standards entrap particulate of a corresponding size. Also, filter materials that are bio-degradable are useful in the practice of this invention. The sizes of the atmospheric contaminates or particulate in ambient air are known. The spheres **13*s*, 13*o*, and the other geometrically-shaped pellets 13 are loosely-gathered together in intersticed receptacles 14 that are fabricated by wire-like material of suitable wire or plastic material to form a mesh 15, and of heat-resistant characteristics when mounted to or at locations contiguous to a hot engine block 22 or the like. Recyclable plastic materials also are adaptable to form the pellets and receptacles. These materials, in the form of receptacles 14, are provided with their corresponding interstices 31 of space through which the polluted ambient air travels to be impacted by the filtering function of the pellets 13 that collect the polluting particulate. The sizes and shapes of receptacles 14** are of a convenient handling-size by a motorist or others, and pliable and manipulatable or maneuverable, so as to be manageable in placing them, with their pellets, into their corresponding locations, cages, envelopes and the like.

The pellets 13 are, of course, larger in dimension than the interstices 31, or the interstices 31 smaller than the size of the pellets 14, or of any mesh characteristics provided in the cages or envelopes where receptacles 14 are not used. Receptacles 14, of course, are larger than the mesh of any cage or envelope. Either the cages, envelopes, etc. are first mounted or otherwise situated at their locations on the vehicles or stationary locations, and the receptacles of pellets thereafter put into them or the receptacles of pellets are first placed in such cages, envelopes, etc., which then are suitably fixedly mounted to their vehicles and stationary locations. The pellets themselves initially, of course, are put into their receptacles 14 where the receptacles are to be utilized rather than just a plurality of pellets being loosely disposed within a corresponding cage, envelope, etc.

Various changes and modifications may be made without affecting the scope and spirit of the following appended claims. It should be understood that where more suitable or feasible to use a pellet instead of a pad or sphere, or to use a pad instead of a pellet or sphere, or to use a sphere instead of a pad or pellet, in the practice of the invention, that such, as well as other forms of collecting and entrapping means, is comprehended and encompassed within the inventive concept of the invention. For example, in the FIG. 7 embodiment, large pollutant-consuming pads are as feasible to use as the spheres; even but one (1) such pad or block for an open-beded van is contemplated. In the FIG. 6 embodiment, the shape of the filtering element is not limited to pellets. In the FIG. 1 et al embodiment, a mass of entrapping substance in the form of a single pad or block [not a sound-absorbing filtering member] is feasible. And so on. The substance of the filtering material of the collecting means (spheres, pads, pellets, etc.) parallels specifications of present known materials for filtering particulate in the atmosphere, although the invention is applicable to any filtering material created and existing in the future that would collect the particulate in polluted ambient air.

INDUSTRIAL APPLICABILITY

The invention is applicable to the vehicle and environmental industries, although it may be found useful in other industries as well.

I claim:

1. In combination with a vehicle adapted for moving through an atmosphere of ambient air that is polluted with particulate,
   an ambient air purifying means comprising
   a plurality of members having a filtering substance that entraps and retains the particulate,
   an envelope having a chamber within a mesh forming openings,
   a plurality of intersticed receptacles, said receptacles being loosely disposed and situated in the chamber of said envelope,
   said plurality of members being loosely-gathered-together and held in each of said receptacles for entrapping and retaining the particulate in the operation of the invention,
   said purifying means mounted amid said vehicle at at least one location exposing said purifying means to the flow of polluted ambient air in the movement of the vehicle through such air.

2. In the purifying means of claim 1, one or more of said members are spherically shaped and of material containing the filtering substance.

3. In the purifying means of claim 1, one or more of said members are pads of material containing the filtering substance.

4. In the purifying means of claim 1, one or more of said members are geometrical configurations of material containing the filtering substance.

5. In the combination of claim 1, said vehicle including an open bed on which said purifying means is mounted.

6. In the combination of claim 1 or claim 5, said vehicle including means for rolling said vehicle along tracks.

7. An ambient air purifying means comprising
   a plurality of members having a filtering substance for entrapping and retaining polluting particulate in ambient air,
   an envelope having a chamber within a mesh forming openings in the envelope,
   a plurality of intersticed receptacles, said receptacles being loosely disposed and situated in the chamber of said envelope,
   said plurality of members being loosely disposed in each of said receptacles for entrapping the particulate in the operation of the invention, and
   means mounted to said envelope for positioning the envelope into the direction of flow of polluted ambient air,
   whereby the particulate is entrapped in said filtering substance of said members as the flow of the polluted ambient air passes through said envelope and receptacles.

8. The purifying means of claim 7 wherein
   one or more of said members are spherically shaped and of material containing the filtering substance.

9. The purifying means of claim 7 wherein
   one or more of said members are pads of material containing the filtering substance.

10. The purifying means of claim 7 wherein
    one or more of said members are geometrical configurations of material containing the filtering substance.

11. The purifying means of claim 7 wherein said positioning means comprises a weather vane.

12. A method for purifying polluted ambient air within the atmosphere comprising
    providing a cage including openings therethrough and having therein a plurality of intersticed receptacles and in which receptacles a plurality of loosely gathered together collecting means having a filtering substance are disposed,
    mounting said cage to a location within a void resulting from the design of a vehicle amid the vehicle, the location always accessible to polluted ambient air in the atmosphere,
    moving the vehicle through the atmosphere containing the polluted ambient air,
    whereby the cage confronts the polluted ambient air and said collecting means collects the particulate in such air by entrapping them in its filtering substance the air passing through thereby being purified, and
    returning directly to the atmosphere the purified ambient air from the collecting means that has purified the polluted ambient air.

* * * * *

UNITED STATES PATENT AND TRADEMARK OFFICE
CERTIFICATE OF CORRECTION

PATENT NO. : 5,509,853
DATED : April 23, 1996
INVENTOR(S) : WELLS, Del

It is certified that error appears in the above-indentified patent and that said Letters Patent is hereby corrected as shown below:

On the title page:
    at [76] read    "250 S. Orchard, Burbank" as
              -- 250 N. Orchard, Burbank -- ;
    below the printed term "Primary Examiner" read/insert
    -- Attorney, Agent, or Firm - Frank L. Zugelter -- .

In col. 10, lines 45 and 46:
    read "loosely gathered together collecting means" as
    -- loosely-gathered-together-collecting means -- .

Signed and Sealed this

Twenty-fourth Day of September, 1996

Attest:

BRUCE LEHMAN

*Attesting Officer*      *Commissioner of Patents and Trademarks*